(12) United States Patent
Lischka et al.

(10) Patent No.: US 8,840,805 B2
(45) Date of Patent: Sep. 23, 2014

(54) SOLUTIONS OF LITHIUM ALUMINUM HYDRIDE

(75) Inventors: Uwe Lischka, Frankfurt am Main (DE); Alexander Murso, Frankfurt am Main (DE); Ulrich Wietelmann, Friedrichsdorf (DE)

(73) Assignee: Chemetall GmbH, Frankfurt am Main (DE)

( * ) Notice: Subject to any disclaimer, the term of this patent is extended or adjusted under 35 U.S.C. 154(b) by 668 days.

(21) Appl. No.: 11/991,132

(22) PCT Filed: Sep. 1, 2006

(86) PCT No.: PCT/EP2006/065919
§ 371 (c)(1),
(2), (4) Date: May 9, 2008

(87) PCT Pub. No.: WO2007/026018
PCT Pub. Date: Mar. 8, 2007

(65) Prior Publication Data
US 2009/0140201 A1    Jun. 4, 2009

(30) Foreign Application Priority Data

Sep. 1, 2005   (DE) .......................... 10 2005 041 773
Jun. 14, 2006  (DE) .......................... 10 2006 028 021

(51) Int. Cl.
| | | |
|---|---|---|
| C01B 6/06 | (2006.01) | |
| C06B 23/00 | (2006.01) | |
| C06B 43/00 | (2006.01) | |
| C06D 5/00 | (2006.01) | |
| C09K 3/00 | (2006.01) | |
| C01B 3/00 | (2006.01) | |
| C01B 6/00 | (2006.01) | |
| B01D 19/00 | (2006.01) | |
| C02F 1/70 | (2006.01) | |
| C01B 17/66 | (2006.01) | |
| C01B 6/24 | (2006.01) | |

(52) U.S. Cl.
CPC ........................................ C01B 6/243 (2013.01)
USPC .............. 252/188.27; 252/188.1; 252/188.26; 423/265; 423/644

(58) Field of Classification Search
USPC .................. 423/644, 265; 252/188.1, 188.26, 252/188.27
See application file for complete search history.

(56) References Cited

U.S. PATENT DOCUMENTS

| | | | |
|---|---|---|---|
| 3,337,308 A | | 8/1967 | Verdieck et al. |
| 6,228,338 B1 * | | 5/2001 | Petrie et al. .................... 423/265 |
| 6,444,190 B2 * | | 9/2002 | Pautard-Cooper et al. ... 423/644 |
| 2001/0051729 A1 | | 12/2001 | Pautard-Copper et al. |
| 2004/0136900 A1 * | | 7/2004 | Dawidowski et al. ......... 423/644 |

FOREIGN PATENT DOCUMENTS

| | | |
|---|---|---|
| EP | 1 394 106 A | 3/2004 |
| WO | WO 97/06097 A | 2/1997 |

OTHER PUBLICATIONS

Finholt et al.; J. Am. Chem. Soc. vol. 69 No. 5 pp. 1199-1203.*
Fisher Scientific MSDS Diethyl ether Jun. 2, 1999 creation date product No. ACC 90868.*

* cited by examiner

*Primary Examiner* — Patrick Ryan
*Assistant Examiner* — Aaron Greso
(74) *Attorney, Agent, or Firm* — Fulbright & Jaworski LLP

(57) ABSTRACT

The invention relates to a solution of lithium aluminum hydride in 2-methyltetrahydrofuran or a solvent mixture containing 2-methyltetrahydrofuran, a method for producing said solution and use of the same.

28 Claims, 1 Drawing Sheet

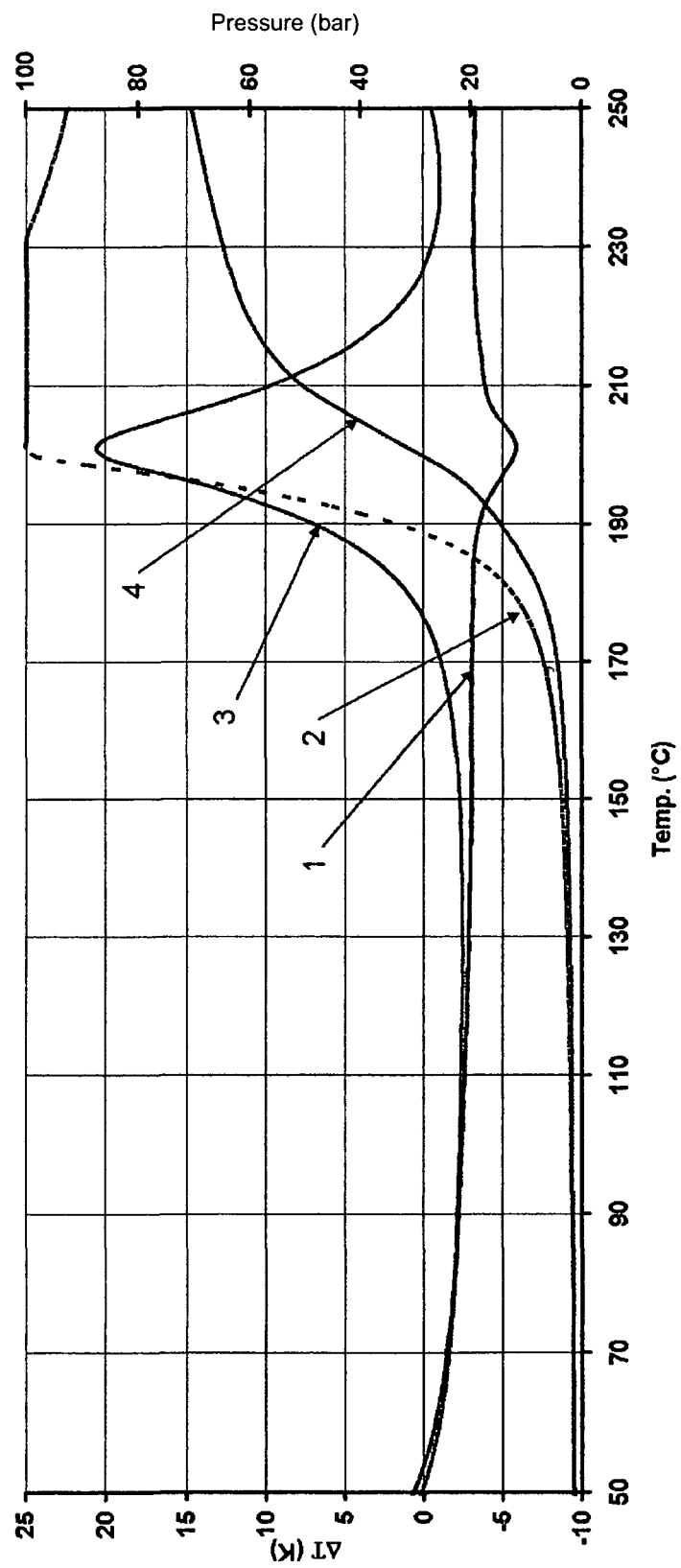

SOLUTIONS OF LITHIUM ALUMINUM HYDRIDE

This application is a §371 of PCT/EP2006/065919filed Sep. 1, 2006, which claims priority from German Patent Application No. DE 10 2005 041 773.6 filed Sep. 1, 2005 and German Patent Application No. DE 10 2006 028 021.0 filed Jun. 14, 2006.

FIELD OF THE INVENTION

The present invention provides a solution of lithium aluminium hydride, a process for the preparation of this solution and the use thereof.

BACKGROUND OF THE INVENTION

Lithium aluminium hydride ($LiAlH_4$) is a strong reducing agent which dissolves well in polar solvents such as diethyl ether ($Et_2O$) or tetrahydrofuran (THF). In the solid, powdered state it is difficult to handle on account of its high reactivity towards air and water, as well as the risk of dust explosions. On an industrial scale, therefore, $LiAlH_4$ solutions in organic solvents are preferably used. $LiAlH_4$ can be prepared by reacting an aluminium halide, in particular aluminium chloride ($AlCl_3$), with lithium hydride (LiH) in an ethereal solvent. In the synthesis developed by Schlesinger et al. (J. Amer. Chem. Soc. 69, 1199 (1947)), $Et_2O$ is employed as the solvent:

Diagram 1:

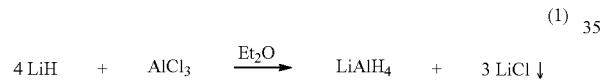

(1)

$LiAlH_4$ is very readily soluble in $Et_2O$ with a proportion of 28%, but this solvent requires complex safety measures owing to its low flash point and boiling point. It is therefore avoided as far as possible in industrial applications.

Commercially supplied $LiAlH_4$ solutions generally contain no $Et_2O$ but are supplied as a 10% solution in THF or a 15% solution in THF/toluene (Chemetall brochure "Industrial Use"). THF has a significantly higher boiling point than $Et_2O$. Thus, the boiling point of THF is 66° C. but that of $Et_2O$ is only 35° C.

There are various methods of preparing solutions of $LiAlH_4$ in THF or solvent mixtures containing THF. One possibility consists in the reaction of sodium aluminium hydride with lithium chloride (LiCl) (WO-A-97/06097):

Diagram 2:

(2)

Disadvantages of this process are the relatively long reaction times and poor yields.

On an industrial scale, THF solutions of $LiAlH_4$ are prepared by dissolving solid, solvent-free $LiAlH_4$ in THF or THF/co-solvent. In this case, the solid $LiAlH_4$ is first synthesised as a solution in diethyl ether, which is subsequently evaporated completely at elevated temperatures and under reduced pressure. However, this process also has serious disadvantages. Firstly, it is relatively expensive owing to its complexity.

Furthermore, the thermal loading of the $LiAlH_4$ during evaporation leads to partial decomposition as in diagram 3:

Diagram 3:

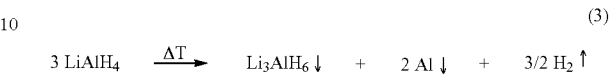

(3)

$Li_3AlH_6$ is insoluble and therefore cannot be used for reduction processes. The solutions prepared by dissolving solid $LiAlH_4$ are markedly cloudy owing to the content of elemental aluminium and $Li_3AlH_6$; the solids content must be removed, e.g. by filtration or decantation. This is because residual contents of elemental aluminium not only impair the handling properties but also cause a clear deterioration in the storage stability, since they catalytically accelerate the decomposition process according to diagram 3.

In order to achieve a solution of $LiAlH_4$ in THF, the synthesis according to diagram 1 can also, in principle, be carried out directly in THF. However, this has the disadvantage that, on the one hand, the solubility of the $AlCl_3$ employed is only relatively low. Thus, at room temperature (RT), the solubility of $AlCl_3$ in THF is only 16%, whereas in $Et_2O$ it is 57%. On the other hand, the LiCl formed as a by-product is readily soluble in THF. Thus, the solubility of LiCl in THF is 4.8%, but in $Et_2O$ it is <0.001%. In this way, only dilute solutions of $LiAlH_4$ in THF could be prepared, and these are at the same time contaminated with LiCl.

OBJECTS OF THE INVENTION

The object of the present invention is to overcome the disadvantages of the prior art.

The object is achieved by the features of the invention. Preferred embodiments are described herein.

BRIEF DESCRIPTION OF THE DRAWING

FIG. 1 shows the thermal stability of $LiAlH_4$ solutions containing 2-MeTHF.

DETAILED DESCRIPTION

In particular, the present invention is intended to provide a $LiAlH_4$ solution which is as concentrated as possible, safe to handle and obtainable inexpensively.

According to the invention, these objects are achieved by a solution of $LiAlH_4$ in 2-methyltetrahydrofuran (2-MeTHF) or a solvent mixture containing 2-methyltetrahydrofuran. Preferably according to the invention, the preparation of $LiAlH_4$ is also carried out in 2-MeTHF or a solvent mixture containing 2-MeTHF.

Surprisingly, it has been found that 2-MeTHF dissolves $AlCl_3$ very well but LiCl hardly at all:

TABLE 1

| RT solubility (wt. %) of | $AlCl_3$ | LiCl | $LiAlH_4$ |
|---|---|---|---|
| In diethyl ether | 57 | <0.001 | 28 |
| In THF | 16 | 4.8 | 21 |
| In 2-MeTHF | 45 | 0.3 | 17 |

Thus, the necessary conditions exist for preparing concentrated LiAlH$_4$ solutions:

Diagram 4:

(4)

4 LiH + AlCl$_3$ $\xrightarrow{\text{2-MeTHF}}$ LiAlH$_4$ + 3 LiCl ↓

The process according to the invention for the preparation of the LiAlH$_4$ solution according to the invention is generally carried out as described below, without limiting the invention thereto:

Powdered LiH is suspended in 2-MeTHF or a hydrocarbon or a 2-MeTHF/hydrocarbon mixture, and a solution of AlCl$_3$ in 2-MeTHF or a 2-MeTHF/hydrocarbon mixture is added to this suspension. The particle size of the LiH is preferably <30 μm. The reaction is strongly exothermic and the heat of reaction is dissipated by external cooling.

The reaction temperature is only limited in the lower range by the solidification temperature and in the upper range by the boiling point of the solvent or solvent mixture employed. In practice, the reaction is carried out at temperatures of between 0° C. and 110° C. At higher temperatures, product decomposition can be expected to start. The preferred reaction temperature is between 20 and 90° C. LiH is generally used in excess, preferably with a 5 to 20% excess.

After complete conversion, the LiCl formed as a by-product is separated off. This operation can take place according to the prior art by a solid/liquid separation step, e.g. by filtration, centrifugation or decantation. Work-up by filtration is preferred. The filtrates are generally clear or only a little cloudy, colourless or slightly yellow. In particular, they are not contaminated by elemental aluminium. Should the concentration of LiAlH$_4$ be too low, they can be concentrated by evaporation, preferably in vacuo.

Furthermore, it has surprisingly been found that the solubility of LiCl in the LiAlH$_4$ solution according to the invention exceeds the solubility in dilute LiAlH$_4$ solutions known from the pure binary system. This can be seen from the following table:

TABLE 2

| LiAlH$_4$ conc. (wt. %) | Molar ratio 2-MeTHF: LiAlH$_4$ | LiCl solubility (wt. %) | (mole %) | Notes |
|---|---|---|---|---|
| 0 | n.a. | 0.3 | n.a. | only 2-MeTHF |
| 5 | 8.3 | 1.2 | 22 | only 2-MeTHF |
| 8 | 5.1 | 1.6 | 16 | only 2-MeTHF |
| 12 | 3.0 | 0.9 | 7 | only 2-MeTHF |
| 11.4 | 2.2 | 0.14 | 1.1 | 2-MeTHF/toluene |
| 14 | 1.6 | 0.08 | 0.6 | 2-MeTHF/toluene | n.a. = not applicable

It is clear that, as the 2-MeTHF:LiAlH$_4$ ratio falls, the LiCl solubility decreases markedly. To achieve the lowest possible concentration of LiCl, a 2-MeTHF:LiAlH$_4$ ratio of 3.0 should preferably not be exceeded in the synthesis mixture, and particularly preferably one of 2.2. This can be achieved either by using the highest possible concentrations of AlCl$_3$ solutions in pure 2-MeTHF or by employing solvent mixtures. Surprisingly, it has been found that aluminium chloride also dissolves well in mixtures of 2-MeTHF and a hydrocarbon.

Thus, for example, the solubility of AlCl$_3$ in a mixture of 76% 2-MeTHF and 24% toluene is about 45%. In this solution, there is a 2-MeTHF:AlCl$_3$ molar ratio of 1.5.

Instead of, or in a mixture with, toluene, other hydrocarbons can also be used, preferably aromatic hydrocarbons such as ethylbenzene, xylenes, cumene, or aliphatics such as cyclohexane, hexane, methylcyclohexane, heptane, individually or as a mixture of at least two of these solvents.

If it is desired to prepare a LiAlH$_4$ solution with the lowest possible LiCl content, the synthesis is preferably carried out in a mixture of 2-MeTHF and a hydrocarbon, particularly preferably a 2-MeTHF/toluene mixture. In a mixture of this type, the 2-MeTHF:AlCl$_3$ molar ratio should not fall below a value of 1.3.

In a particularly preferred embodiment of the process of the invention, LiH is suspended in a hydrocarbon, e.g. toluene, and a solution of AlCl$_3$ in a 2-MeTHF/hydrocarbon mixture, preferably in a 2-MeTHF/toluene mixture, is added. In this solution, the 2-MeTHF:AlCl$_3$ ratio is between 1.3 and 3.0, with a 2-MeTHF:AlCl$_3$ ratio of 1.5 to 2.0 being preferred.

In comparison with the water-miscible THF, which has a marked tendency to form peroxide, 2-MeTHF offers substantial advantages when used in organic synthesis. On the one hand, owing to its higher boiling point, it allows higher temperatures to be set without the need to increase the external pressure. Thus, the boiling point of 2-MeTHF is 78° C. compared with only 66° C. for THF. This is an advantage for the hydrogenation of low-reactivity functional groups such as e.g. organic chlorides.

Surprisingly, it has also been found that LiAlH$_4$ solutions containing 2-MeTHF exhibit particular thermal stability: in contrast to solutions in THF, they decompose endothermically. Even at relatively high temperatures, therefore, no so-called "runaway" scenario can be expected. This makes it possible to work safely even at high temperatures.

The thermal stability of LiAlH$_4$ solutions containing 2-MeTHF is illustrated in FIG. 1. This compares the results of Differential Scanning Calometry tests in a Radex apparatus on a 12% solution of LiAlH$_4$ in 2-MeTHF/toluene with that of a 15% solution of LiAlH$_4$ in THF/toluene. In each case, 2 g were weighed out and the rate of heating was 45 K/h.

Curve 1: 12% solution of LiAlH$_4$ in 2-MeTHF/toluene: ΔT;
Curve 2: 12% solution of LiAlH$_4$ in 2-MeTHF/toluene: pressure;
Curve 3: 15% solution of LiAlH$_4$ in THF/toluene: ΔT;
Curve 4: 15% solution of LiAlH$_4$ in THF/toluene: pressure.

The user draws further advantages from the fact that 2-MeTHF and water are miscible only to a limited extent. Thus, the solubility of 2-MeTHF in water is 15.1% but the solubility of water in 2-MeTHF is only 5.3%. It is therefore possible to isolate an organic synthesis product together with 2-MeTHF by phase separation. Only relatively minor product and solvent losses can be expected through the aqueous phase, from which the solvent cannot generally be recovered. For this reason, 2-MeTHF is simple to recycle.

The invention provides in detail:
- a solution of LiAlH$_4$ in 2-MeTHF or a solvent mixture which contains 2-MeTHF;
- a solution of LiAlH$_4$ in 2-MeTHF or a solvent mixture which contains 2-MeTHF, wherein the LiAlH$_4$ content is at least 11 wt. %;
- a solution of LiAlH$_4$ in 2-MeTHF or a solvent mixture which contains 2-MeTHF, wherein the LiAlH$_4$ content is at least 14 wt. %;
- a solution of LiAlH$_4$ in 2-MeTHF or a solvent mixture which contains 2-MeTHF, wherein the LiAlH$_4$ concentration is at least 5 wt. % and the molar ratio of 2-MeTHF:LiAlH$_4$ does not exceed the value of 3.0;

a solution of LiAlH$_4$ in 2-MeTHF or a solvent mixture which contains 2-MeTHF, wherein the LiAlH$_4$ concentration is at least 5 wt. % and the molar ratio of 2-MeTHF:LiAlH$_4$ does not exceed the value of 2.2;

a solution of LiAlH$_4$ in 2-MeTHF or a solvent mixture which contains 2-MeTHF, wherein the LiAlH$_4$ concentration is at least 10 wt. % and the molar ratio of 2-MeTHF:LiAlH$_4$ does not exceed the value of 2.2;

a solution of LiAlH$_4$ in 2-MeTHF or a solvent mixture which contains 2-MeTHF, wherein the solvent contains at least one hydrocarbon;

a solution of LiAlH$_4$ in 2-MeTHF or a solvent mixture which contains 2-MeTHF, wherein the hydrocarbon is an aromatic hydrocarbon;

a solution of LiAlH$_4$ in 2-MeTHF or a solvent mixture which contains 2-MeTHF, wherein the aromatic hydrocarbon is selected from toluene, ethylbenzene, xylene or cumene or a mixture of at least two of these hydrocarbons;

a solution of LiAlH$_4$ in 2-MeTHF or a solvent mixture which contains 2-MeTHF, wherein the aromatic hydrocarbon is toluene;

a solution of LiAlH$_4$ in 2-MeTHF or a solvent mixture which contains 2-MeTHF, wherein the hydrocarbon is an aliphatic hydrocarbon;

a solution of LiAlH$_4$ in 2-MeTHF or a solvent mixture which contains 2-MeTHF, wherein the aliphatic hydrocarbon is selected from cyclohexane, hexane, methylcyclohexane or heptane or a mixture of at least two of these hydrocarbons;

a process for the preparation of the LiAlH$_4$ solution according to the invention, wherein AlCl$_3$ is reacted with LiH in 2-MeTHF or a solvent containing 2-MeTHF;

a process for the preparation of the LiAlH$_4$ solution according to the invention, wherein the LiH concentration in the feed is between 3 and 17 wt. %, preferably between 5 and 15 wt. %;

a process for the preparation of the LiAlH$_4$ solution according to the invention, wherein the LiH powder employed has a particle size of <30 μm;

a process for the preparation of the LiAlH$_4$ solution according to the invention, wherein the reaction temperature is between 0 and 100° C., preferably between 20 and 90° C., particularly preferably between 30 and 80° C.;

a process for the preparation of the LiAlH$_4$ solution according to the invention, wherein the reaction is carried out in the presence of hydrocarbons;

a process for the preparation of the LiAlH$_4$ solution according to the invention, wherein the hydrocarbons are selected from toluene, ethylbenzene, xylene, cumene, cyclohexane, hexane, methylcyclohexane, heptane or a mixture of at least two of these hydrocarbons;

a process for the preparation of the LiAlH$_4$ solution according to the invention, wherein the hydrocarbon is toluene;

a process for the preparation of the LiAlH$_4$ solution according to the invention, wherein the molar ratio of 2-MeTHF:AlCl$_3$ is between 1 and 10, preferably between 1.3 and 5.0;

a process for the preparation of the LiAlH$_4$ solution according to the invention, wherein the LiCl forming as a by-product is separated off;

a process for the preparation of the LiAlH$_4$ solution according to the invention, wherein, to remove LiCl, the solution is concentrated to a molar ratio of 2-MeTHF:LiAlH$_4$ of no more than 3.5 and the precipitated LiCl is separated off by a solid/liquid separation step, preferably by filtration;

a process for the preparation of the LiAlH$_4$ solution according to the invention, wherein, to remove LiCl, the reaction solution is concentrated in vacuo, preferably under a pressure of between 1 and 500 mbar, and at a temperature of between 20 and 100° C.;

the use of the LiAlH$_4$ solution according to the invention as a reducing agent.

In an embodiment of the invention, the molar ratio of 2-MeTHF:AlCl$_3$ is between 1 and 10, preferably between 1.3 and 5.0.

The invention is explained below by examples, without being limited thereto:

EXAMPLE 1

Preparation of an 8% LiAlH$_4$ Solution in Pure 2-MeTHF

In an inerted, i.e. dried and filled with protective gas, e.g. nitrogen or argon, 1-liter reactor having a double-walled jacket, 41.7 g LiH powder are suspended in 40 g 2-MeTHF. The suspension is heated to 35° C. and a solution of 158.7 g AlCl$_3$ in 370 g 2-MeTHF is added dropwise within 3 hours, while stirring well. After a 1.5-hour post-reaction period at 35 to 40° C., the reaction suspension is emptied on to a G3 glass filter.

407 g of a slightly yellow, clear solution are obtained.

| Analysis (mmol/g) | | | |
| --- | --- | --- | --- |
| Li | Al | H$^-$ | Cl$^-$ |
| 2.50 | 2.13 | 9.33 | 0.37 |

From this, the following is calculated:
LiAlH$_4$ =8.1 wt. % (based on Al analysis)
LiCl =1.6 wt. % ($\hat{=}$17 mole %, based on Al)
Yield: 73% of theory.

The filter residue is washed with 2-MeTHF; a further 16% of theory is obtained in the form of the wash filtrates.

EXAMPLE 2

Preparation of a low LiCl Content LiAlH$_4$ Solution in 2-MeTHF by an Evaporation Process 117 g of the LiCl-containing wash filtrates from example 1 are concentrated by distillation at 40 to 60° C. and under a reduced pressure of 250 mbar. A total of 80.0 g solvent is distilled off. After removing approximately ⅔ of the quantity mentioned, colourless crystals begin to precipitate.

On completion of the distillation process, the suspension is cooled to room temperature and filtered through a G3 fritted glass filter until clear.

Final weight: 36.0 g
The analysis gave the following results:

TABLE 3

| Substance sample | Li | Al | H$^-$ | Cl$^-$ | LiAlH$_4$ | LiCl |
| --- | --- | --- | --- | --- | --- | --- |
| | (mmol/g) | | | | (wt. %) | (mole %) |
| Before distillation | 0.77 | 0.45 | 1.87 | 0.18 | 1.7 | 40 |
| After distillation | 2.11 | 1.75 | 7.03 | 0.28 | 6.6 | 16 |

By means of a further evaporation step to a $LiAlH_4$ concentration of 12.3%, the content of soluble LiCl is reduced to 7 mole %.

EXAMPLE 3

Preparation of an 11% $LiAlH_4$ Solution in 2-MeTHF/toluene

In an inerted 1-liter reactor, 59.9 g LiH powder are suspended in 140 g toluene and heated to 75° C. Into this suspension, 504 g of a 44% solution of $AlCl_3$ in a mixture of 2-MeTHF and toluene and in a 2MeTHF:$AlCl_3$ ratio of 1.5 are metered within 80 minutes. On completion of the addition, stirring is continued for a further 30 minutes at 80° C. and the suspension is then emptied on to a preheated filter.

253 g of a yellow solution with the following composition are obtained:

| Analysis (mmol/g) | | | |
|---|---|---|---|
| Li | Al | H⁻ | Cl⁻ |
| 3.02 | 3.00 | 12.4 | 0.034 |

The $LiAlH_4$ concentration is 11.4% (≙98% of theory) and the LiCl concentration is 1.1 mole %, based on $LiAlH_4$.

The filter residue is washed twice with toluene. In all the filtrates, 17.4 g $LiAlH_4$ content is obtained (≙91% of theory).

It is claimed:

1. A solution comprising $LiAlH_4$ in a solvent, wherein the solvent comprises 2-MeTHF, wherein the $LiAlH_4$ concentration is at least 5 wt. %, the molar ratio of 2-MeTHF:$LiAlH_4$ does not exceed a value of 3.0, and wherein the molar ratio of 2-MeTHF:$AlCl_3$ is between 1 and 10.

2. The solution according to claim 1, wherein solvent further comprises at least one hydrocarbon.

3. The solution according to claim 1, wherein the $LiAlH_4$ content is at least 11 wt. %.

4. The solution according to claim 1, wherein the $LiAlH_4$ content is at least 14 wt. %.

5. The solution according to claim 1, wherein the $LiAlH_4$ concentration is at least 10 wt. %.

6. The solution according to claim 2, wherein the hydrocarbon comprises at least one aromatic hydrocarbon.

7. The solution according to claim 6, wherein the at least one hydrocarbon is selected form the group consisting of toluene, ethylbenzene, xylene and cumene.

8. The solution according to claim 2, wherein the hydrocarbon is toluene.

9. The solution according to claim 2, wherein the hydrocarbon is at least one an aliphatic hydrocarbon.

10. The solution according to claim 2, wherein the hydrocarbon comprises at least one of cyclohexane, hexane, methylcyclohexane or heptane.

11. A process comprising preparing a solution according to claim 1 by reacting $AlCl_3$ with LiH in the solvent comprising 2-MeTHF.

12. The process according to claim 11, wherein the solvent further comprises at least one hydrocarbon.

13. The process according to claim 12, wherein the at least one hydrocarbon is selected from the group consisting of toluene, ethylbenzene, xylene, cumene, cyclohexane, hexane, methylcyclohexane and heptane.

14. The process according to claim 11, wherein the solvent further comprises toluene.

15. The process according to claim 11, wherein the concentration of LiH in a feed is between 3 and 17 wt. % of the solution.

16. The process according to claim 11, wherein the LiH is added as a powder and has a particle size of <30 μm.

17. The process according to claim 11, wherein the reaction temperature is between 0 and 100° C.

18. The process according to claim 11, wherein the reaction temperature is between 20 and 90° C.

19. The process according to claim 11, wherein the reaction temperature is between 30 and 80° C.

20. The process according to claim 11, further comprising the step of separating any LiCl formed as a by-product from the solution.

21. The process according to claim 11, further comprising the step of concentrating the solution to a molar ratio of 2-MeTHF:$LiAlH_4$ of no more than 3.5 and separating any precipitated LiCl by a solid/liquid separation step.

22. The process according to claim 21, wherein the solid/liquid separation step is filtration.

23. The process according to claim 11, wherein the reaction solution is concentrated in vacuo.

24. The process of claim 23, wherein the in vacuo pressure is between 1 and 500 mbar and the temperature is between 20 and 100° C.

25. A process comprising chemically reducing a reducable chemical by adding a sufficient amount of a the solution of claim 1 to act as a reducing agent to reduce the chemical.

26. The solution according to claim 1, wherein the solution is not contaminated by elemental aluminum.

27. A solution comprising $LiAlH_4$ in a solvent, wherein the solvent comprises 2-MeTHF, wherein the $LiAlH_4$ concentration is at least 5 wt. %, the molar ratio of 2-MeTHF:$LiAlH_4$ does not exceed a value of 3.0, and wherein the solution is not contaminated by elemental aluminum.

28. A solution comprising $LiAlH_4$ in a solvent, wherein the solvent comprises 2-MeTHF, wherein the $LiAlH_4$ concentration is at least 11 wt. %, and wherein the molar ratio of 2-MeTHF:$LiAlH_4$ does not exceed a value of 3.

* * * * *